United States Patent [19]

Zenor et al.

[11] 4,026,160

[45] May 31, 1977

[54] NON-TUMBLING LIMIT STOP PROVIDING A MECHANICAL SUPER CAGE

[75] Inventors: Hughes M. Zenor, Rolla, Mo.; John C. Weaver, Ridgecrest, Calif.

[73] Assignee: The United States of America as represented by the Secretary of the Navy, Washington, D.C.

[22] Filed: May 6, 1976

[21] Appl. No.: 683,997

[52] U.S. Cl. .................................................. 74/5.4
[51] Int. Cl.² ....................................... G01C 19/54
[58] Field of Search ........................... 74/5.4, 5 R

[56] References Cited

UNITED STATES PATENTS

| | | | |
|---|---|---|---|
| 1,499,320 | 6/1924 | Schein | 74/5.4 |
| 3,238,795 | 3/1966 | Greenberg et al. | 74/5.4 X |
| 3,618,403 | 11/1971 | Bilinski | 74/5 |

*Primary Examiner*—Edgar W. Geoghegan
*Attorney, Agent, or Firm*—R. S. Sciascia; Roy Miller; Thomas W. Hennen

[57] ABSTRACT

A non-tumbling limit stop for limiting the relative motion between a structure and a gyroscope pivotably mounted thereon. The limit stop employs frictional contact forces to cause the gyroscope to precess away from the stop rather than tangent to it, and thus preventing tumbling of the gyroscope while enabling high slew rates of the gyroscope spin axis.

9 Claims, 8 Drawing Figures

NON-TUMBLING LIMIT STOP PROVIDING A MECHANICAL SUPER CAGE

BACKGROUND OF THE INVENTION

1. Field of the Invention

This invention pertains to stops for limiting the relative motion between a gyroscope and a structure to which the gyroscope is pivotably mounted, and more particularly to such limit stops which prevent tumbling of the gyroscope when contact between the gyroscope case and the limit stop occurs.

2. Description of the Prior Art

Gyroscopes, or gyros as they are sometimes called, are widely used in navigation systems because of their ability to maintain a fixed axis in space when mounted pivotably to a structure which changes its orientation in space. In such applications the gyro is mounted in gimbals and will maintain its spin axis direction regardless of the orientation of the structure to which it is attached. In some missile applications it is desirable that the gyro mounting only allow limited relative movement between the gyro spin axis and the missile structure. This is usually accomplished by mounting limit stops near the gyro so that when a non-spinning portion of the gyro case approaches and contacts the limit stop the spin axis will be slewed by the limit stop to assume a new orientation in space.

In general, when a gyro hits a limit stop, precession forces tend to move the gyro tangent to the limit stop surface at the point of contact. Since the limit stop in a missile usually forms a closed curve such as a circle or square, the gyro precessing tangent to the surface begins a very rapid and violent traversal of the limit stop. When this occurs, the gyro is said to tumble and it may require an appreciable length of time before it can recover from the tumble and again be usable. In particular, the gyros in some guided missiles will tumble when the gyro contacts a limit stop and will at that instant abort the mission.

If it is desired to slew the gyro spin axis at an extra fast rate, it is necessary either to apply extra large precessional forces to the gyro or to mechanically cage the gyro during the slewing maneuver. Both of these methods have disadvantages. Excessively large amplifiers and other electronic equipment are required to supply the large currents needed by precession coils to produce large precession forces, and mechanical caging requires additional mechanisms as well as additional time for the caging and uncaging cycles. The non tumbling limit stop of this invention prevents gyro tumbling and at the same time enables high slew rates of the gyro spin axis by using normal precessional forces and frictional contact forces to produce a mechanical super cage.

SUMMARY OF THE INVENTION

A limit stop which circumscribes relative motion between a cased spinning gyro and the structure to which it is pivotally attached, is provided with frictional material at the point of contact between the case of the gyro and the limit stop. This frictional material prevents tangential motion between the gyro case and the limit stop at the point of contact and thereby causes the gyro to precess away from the stop rather than tangent to it. In this way, violent tumbling of the gyro when the gyro contacts a limit stop is prevented. Since the gyro does not tumble, it is ready to continue operation immediately upon reaching its new spin axis orientation.

An advantage of this invention is that, should it be desired to slew the structure to which the gyro is pivotally mounted at a rapid rate, the gyro will not tumble, and when the slew has been completed it is possible for normal precessional procedures to take place and align the gyro with the target.

BRIEF DESCRIPTION OF THE DRAWINGS

Further advantages of the present invention will emerge from the detailed description which follows of many possible embodiments of a non tumbling limit stop according to the invention, given with reference to the accompanying drawing figures, in which.

DETAILED DESCRIPTION

Figure 1:
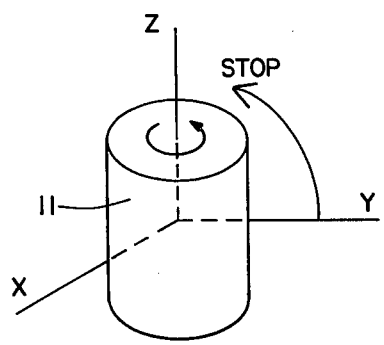
FIG. 1 is a perspective view of a rotating mass.
Figure 2:
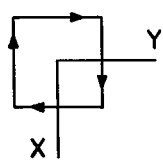
FIG. 2 shows the path of gyro tumble when constrained by a square limit stop arrangement.
Figure 3:
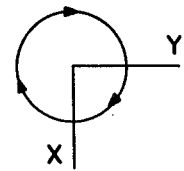
FIG. 3 shows the path of gyro tumble when constrained by a circular limit stop arrangement.

Referring now to the drawings wherein like reference numerals denote like parts and elements throughout the several figures, there is shown in FIG. 1 gyro 11 spinning about the Z axis. If gyro 11 precesses about the X axis as shown by the arrow in FIG. 1 until a stationary part of gyro 11 contacts a stop placed in the YZ plane, gyro 11 will then precess about the Y axis. That is, the spin axis of the gyro will move in a direction tangent to the surface of the stop. If the system of stops from a rectangle as shown in FIG. 2, the motion of the spin axis of gyro 11 will be from stop to stop to stop, and the motion may become quite violent. If the stop is circular, as shown in FIG. 3, the spin axis of gyro 11 will go in a circular pattern, and this motion may be even more violent than if the limit stop were rectangular.

Figure 4:
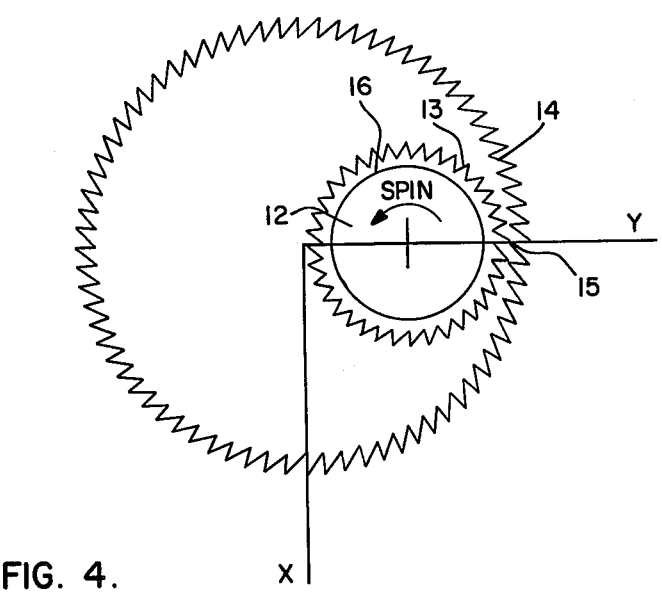
FIG. 4 is a schematic view of one possible embodiment of the invention.

If ratchet teeth 13 and 14 having essentially the same pitch are cut in the stop and gyro case 16 as shown in FIG. 4, and if gyro 12 is spinning counterclockwise about the Z axis and is precessing about the X axis so that the teeth of the two ratchets will contact at point 15, the normal force will tend to move the spin axis of gyro 12 in the direction of increasing X. However, since the ratchet teeth 13 and 14 are in contact, there will be a force of case 16 on gyro 12 in the direction of decreasing X which will tend to precess gyro 12 away from the stop at 15, in the direction of decreasing Y. Thus, by placing a plurality of ratchet teeth 13 and 14 on gyro case 16 and on the limit stop, a device that will precess the gyro away from the stop on contact is created.

In practice it has been found that a device of this sort works as predicted. However, there is an optimum angle of contact for the movement of the case in any direction, and if the gyro does not make contact at this point, the gyro will sometimes jump from tooth to tooth until it has arrived at the optimum position.

Figure 5:
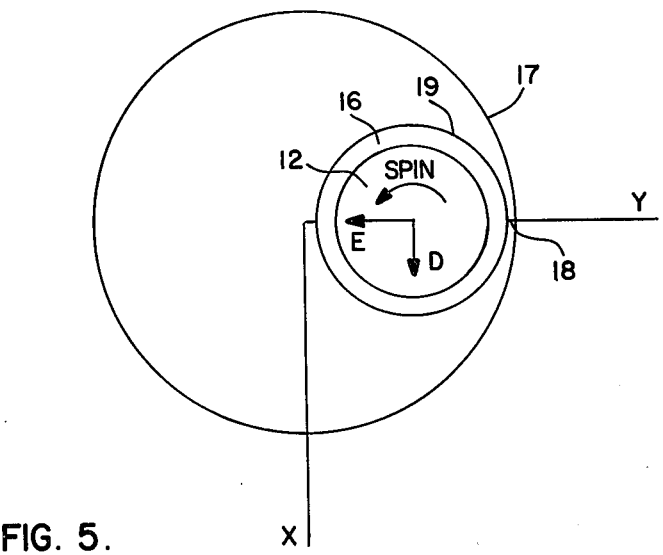
FIG. 5 is a schematic view of one possible embodiment of the invention.

The operation of gyro 12 will be improved if both the surface of gyro case 19 and the surface of limit stop 17 are smooth from a macrosopic standpoint. The surfaces so chosen should have a maximum coefficient of friction, so that when gyro 12 tends to tumble tangent to a limit stop in the direction of D, or increasing X in FIG. 5, there will be a force on gyro 12 tangent to the stop in the direction of decreasing X, or opposite of direction D in FIG. 5. This force will precess gyro 12 away from limit stop 17 in the direction of E, or decreasing Y.

One method of maintaining a smooth surface and still having a high coefficient of friction between case surface 19 and limit stop surface 17 is to utilize the principal of the V-belt. If a substance having a high coefficient of friction, such as rubber, is placed on gyro case 16 either in the form of O-ring 25, as shown in FIG. 6, or of V-belt 21 as shown in FIG. 7, or a combination of the two as shown in FIG. 8, a high coefficient of friction may be obtained without loosing the smooth action.

Another advantage of O-ring construction is that in the O-ring there is some resiliance. In order for this device to operate properly, it is desirable that there be sufficient resiliance so that time of contact of a stop with the gyro case is greater than the period of nutation of the gyro. Otherwise abnormal nutations will be developed and the normal precession will not occur.

Figure 6:
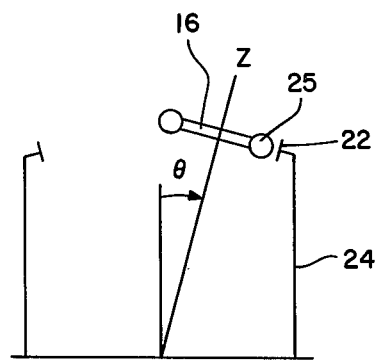
FIG. 6 is a schematic side view of a gyro and non tumbling limit stop arrangement according to the invention.
Figure 7:
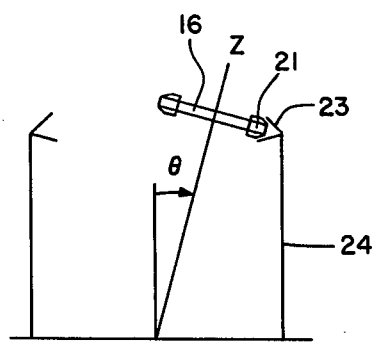
FIG. 7 is a schematic side view ofa gyro and non tumbling limit stop arrangement according to the invention.
Figure 8:
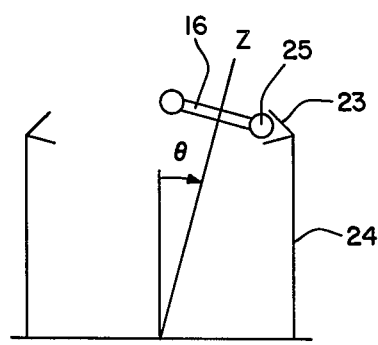
FIG. 8 is a schematic side view of a gyro and non tumbling limit stop arrangement according to the invention.

As is shown variously in FIGS. 6, 7 and 8, a compatible stop for use with O-ring 25 would be flat surface 22 which is supported by supporting structure 24. Surface 22 provides a normal surface for O-ring 25 contact. Contact surface 23 for use with V-belt 21 similarly provides a compatible surface for achieving a maximum frictional force. Inclination angle $\theta$ shows the amount of deviation from the central gyro position permitted by the various limit stops.

Since the coefficient of friction between gyro case surface 19 and limit stop surface 17 is generally less than 1.00 to 100%, the motion is not exactly normal tothe contacting surface. One way to make the motion of gyro case surface 19 more nearly normal to limit stop surface 17 is to rotate the limit stop at the proper rate in the direction of gyro spin.

Of course, a gyro slewing device could also be constructed using the principle of this invention. In such a device, a movable limit stop could be used to slew the gyro spin axis relative to the structure to which the gyro is suspended. The movable limit stop would move into frictional contact with the gyro case and cause the gyro to precess away from the stop. The gyro could thus be slewed to a new orientation in space and relative to the supporting structure without tumbling. More than one movable limit stop could be constructed to move in more than one direction. Any suitable means, such as a solenoid, hydraulic cylinder or other device, could be used to move the limit stop in response to commands from a control system.

Obviously many modifications and variations of the present invention are possible in the light of the above teachings. It is therefore to be understood that within the scope of the appended claims the invention may be practiced otherwise than as specifically described.

What is claimed is:

1. A limit stop for use with a gyroscope which is at least partially encased and suspended for limited movement relative to a structure, said limit stop comprising:
    a frictional element attached to a gyroscope case; and
    a motion limiting member having a frictional contact surface, said motion limiting member being attached to said structure, said motion limiting member defining a limit of gyroscope motion relative to said structure, and said frictional contact surface positioned to contact said frictional element at a limit of said gyroscope relative movement;
    so arranged and constructed that contact between said frictional contact surface will cause said gyroscope to precess away from said limit stop and thus permit controlled slewing of the gyroscope spin axis.

2. The limit stop of claim 1 wherein said motion limiting member defines an annular frictional contact surface for limiting gyroscope relative motion.

3. The limit stop of claim 1 wherein said frictional element is resilient.

4. The limit stop of claim 1 wherein said frictional contact surface on said motion limiting member is resilient.

5. The limit stop of claim 1 wherein said frictional element is an annular belt.

6. The limit stop of claim 1 wherein said frictional element has a first plurality of ratchet teeth and said frictional contact surface has a second plurality of ratchet teeth for engaging said first plurality of ratchet teeth.

7. The limit stop of claim 5 wherein said annular belt has a trapezoidal section.

8. The limit stop of claim 5 wherein said annular belt has a circular section.

9. A gyroscope precesssion apparatus for slewing the spin axis of a gyroscope which is at least partially encased and suspended for limited movement relative to a structure, said apparatus comprising:
    a frictional element attached to a gyroscope case;
    at least one slewing member having a frictional contact surface, said slewing member being movably attached to said structure, and able to move between first and second positions, said frictional contact surface being positioned to contact said frictional element when said slewing member is traversed between first and second positions; and
    means for selectively traversing said slewing member between first and second positions;
    so arranged and constructed that said slewing member traversing between said first and second positions will contact said frictional element on said case and cause said gyroscope to precess away from said slewing member, slewing said gyroscope spin axis.

* * * * *